United States Patent
Kakizaki et al.

(10) Patent No.: US 6,728,224 B1
(45) Date of Patent: Apr. 27, 2004

(54) PORTABLE MOBILE TERMINAL AND TRANSMISSION UNIT

(75) Inventors: Shinji Kakizaki, Kawasaki (JP); Kunitoshi Yonekura, Kawasaki (JP); Katsuhiko Kawasaki, Sapporo (JP); Youji Nakata, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/373,073

(22) Filed: Aug. 11, 1999

(30) Foreign Application Priority Data

Feb. 5, 1999 (JP) .......................................... 11-029203

(51) Int. Cl.⁷ ................................................ H04Q 7/00

(52) U.S. Cl. ...................... 370/313; 370/342; 375/130; 455/127.3; 330/133

(58) Field of Search ................................ 370/329, 335, 370/342, 278; 375/141, 146, 147, 345, 130, 295, 297; 455/422, 232.1, 234.1–253.2, 127.2, 127.3; 330/133

(56) References Cited

U.S. PATENT DOCUMENTS

| | | | |
|---|---|---|---|
| 5,287,555 A | 2/1994 | Wilson et al. | |
| 5,752,172 A | 5/1998 | Matero | |
| 5,862,460 A * | 1/1999 | Rich | 455/116 |
| 5,926,749 A * | 7/1999 | Igarashi et al. | 455/127.2 |
| 5,991,329 A * | 11/1999 | Lomp et al. | 375/130 |
| 6,175,586 B1 * | 1/2001 | Lomp | 375/130 |
| 6,208,873 B1 * | 3/2001 | Black et al. | 455/126 |
| 6,226,316 B1 * | 5/2001 | Schilling et al. | 375/139 |
| 6,236,848 B1 * | 5/2001 | Igarashi et al. | 455/341 |
| 6,370,203 B1 * | 4/2002 | Boesch et al. | 375/297 |
| 6,498,927 B2 * | 12/2002 | Kang et al. | 455/245.2 |

FOREIGN PATENT DOCUMENTS

| | | |
|---|---|---|
| JP | 4-23524 | 1/1992 |
| JP | 9-172380 | 6/1997 |
| JP | 10-93450 | 4/1998 |

OTHER PUBLICATIONS

Hayashi, et al., "An MMIC Variable–Gain Amplifier Using A Cascode–Connected FET with Constant Phase Deviation" IEICE Transactions on Electronics, vol. E81–C, No. 1, Jan. 1998 pp. 70–77, XP000767491, ISSN: 0916–8524.
Neal: "HBT Technology Adds Power to CDMA Chip Set" Microwaves & RF, Dec. 1994, XP002217461.
Hayashi, et al. "An IF–Band MMIC Chip Set for HighSpeed Wireless Communication Systems" IEICE Transactions on Electronics, vol. E81–C, No. 1, Jan. 1998 pp. 63–69 XP000767490: ISSN: 0916–8524.

* cited by examiner

Primary Examiner—Hassan Kizou
Assistant Examiner—Christopher M. Swickhamer
(74) Attorney, Agent, or Firm—Katten Muchin Zavis Rosenman

(57) ABSTRACT

A portable mobile terminal or a transmission unit, applicable to multiplex radiocommunication systems including a CDMA, comprises a modulating section for modulating a transmission signal by using a spectrum spread system, an amplifying section for amplifying the modulated transmission signal to a needed transmission power, a plurality of variable gain units provided between the modulating section and the amplifying section to be connected in series to each other to provide an ability of changing a gain of the transmission signal modulated by the modulating section, and respectively having gain-to-phase characteristics set to cancel a phase variation of the transmission signal to the entire gain variation, and a control section for controlling a gain of each of the variable gain units. The portable mobile terminal and the transmission unit can control the transmission power in multistage throughout a wide range, and can minimize the phase variation of the transmission signal at that time.

23 Claims, 10 Drawing Sheets

PORTABLE MOBILE TERMINAL AND TRANSMISSION UNIT

BACKGROUND OF THE INVENTION (1) Field of the Invention

The present invention relates to a portable mobile terminal and a transmission unit, and more particularly to a portable mobile terminal and a transmission unit suitably applicable to communication systems in which a transmission power needs to be variable.

(2) Description of the Related Art

In mobile communication (multiplex radiocommunication) services including portable telephone services, there is a case that a base station needs the same receive power (reception strength) from mobile units (portable mobile terminals) irrespective of the distances from the mobile units. For instance, this requirement is imposed on a CDMA (Code-Division. Multiple Access) system in which a plurality of mobile units (subscribers) share the same frequency band in a manner that each of the mobile units performs a spread (diffusion) spectrum modulation of a transmission signal using a different code.

This is generally referred to as the "far and near (distance) problem", and in the case of the CDMA system, a transmission signal (that is, an undesired wave) from another mobile unit produces an interference component to some base station (receiver). For instance, if a mobile unit generating an undesired wave exists in a range close to the base station, significant level interference may take place by that undesired wave; hence, there is a need to equalize the signal reception levels from the mobile units in the base station by controlling the transmission powers of the mobile units finely.

For this reason, the mobile unit needs to be designed such that its transmission power is variable in a range as wide as possible and is controllable in multistage (stepwise) fashion (for example, in units of 1 dB to several dB).

One configuration to realize such a function may be, for example, as shown in FIG. 11. That is, as shown in FIG. 11, in a mobile unit, a transmission system (transmission unit) 1' is included which principally comprises an oscillator 3, a modulator 4, a variable gain type amplifier (variable gain circuit) 5, a frequency converting section (up-converter) 5C, a power amplifier 6, a directional coupler 7, a duplexer (an antenna sharing unit) 8, a transmission/receive antenna 9, a frequency converting section (down-converter) 10A, a received signal strength indicator (RSSI) detector (a direct-current voltage converting section) 12, a controller 13' containing a memory 14', a digital/analog (D/A) converter 15 and others. Incidentally reference numeral 2 designates a reception system made generally to share the transmission/receive antenna 9 with the transmission system 1' through the duplexer 8.

In this configuration, the oscillator 3 is made to generate a carrier signal, while the modulator (modulating section) 4 is, for example, made to perform an orthogonal modulation (QPSK or the like: primary modulation) of a transmission signal (baseband signals I, Q) through the use of the carrier signal from the oscillator 3, before conducting spread modulation (secondary modulation) thereof with a predetermined spread code. The variable gain (gain varying) circuit 5 is designed to be capable of changing the gain of a transmission signal undergoing the modulation in the modulator 4, with its gain being controlled by the controller 13' in a state where the D/A converter 15 is interposed therebetween.

The up-converter 5C is made such that a mixer 51 mixes a transmission signal [intermediate frequency (IF) signal], whose gain is changed in the gain variable circuit 5, with a signal from an oscillator 52 to frequency-convert (up-convert) the transmission signal into a radio frequency (RF) signal.

The power amplifier 6 is for conducting a linear amplification of a transmission signal (RF signal) from this up-converter 5C. After passing through the directional coupler 7 and the duplexer 8, the transmission signal amplified is transmitted toward a base station (not shown).

The directional coupler 7 is for deriving a portion of the transmission signal (transmission power) amplified linearly in the power amplifier 6, with the transmission signal, (RF signal) taken out being supplied to the down-converter 10A. The down-converter 10A is for frequency-converting (down-converting) the transmission signal (RF signal) taken out by the directional coupler 7 into a signal with an intermediate frequency (IF) in a manner that a mixer 10 mixes this transmission signal with a signal from an oscillator 11, while the RSSI detector 12 is for converting the transmission signal, down-converted by the mixer 10 into a direct-current voltage (RSSI signal) of a value corresponding to its power [that is, the present transmission power in the transmission system 1' (the present RSSI in the base station)].

Thus, a portion composed of the directional coupler 7, the mixer 10, the oscillator 11 and the RSSI detector 12 functions as a transmission power detecting section 18 to detect (monitor) the transmission power of the transmission signal amplified by the power amplifier 6.

Furthermore, the controller 13' is for producing a gain control signal to control the gain of the variable gain circuit 5 so that the aforesaid RSSI signal (the present transmission power of the transmission system 1') assumes a power value corresponding to a transmission power control signal from a base station (external) detected in the reception system 2. For instance, referring to data representative of the mapping (corresponding relationship) of gain control signals (control voltage values) to RSSI signals and Transmission power control signals, stored in the built-in memory 14' in advance, the corresponding control voltage value is outputted, for example, in the form of digital data of n-bit (n depicts a natural number).

The D/A converter 15 is for converting the control voltage value (n-bit digital data) outputted from the controller 13' into analog data which in turn, comes in the variable gain circuit 5.

That is, the controller 13' and the D/A converter 15, together with the transmission power detecting section 18 (the directional coupler 7, the mixer 10, the oscillator 11 and the RSSI detector 12), form a feedback control system 16 to implement the feedback-control of the present transmission power by adjusting the gain of the variable gain circuit 5 so that the present transmission power assumes a power value corresponding to a transmission power control signal from a base station.

In the transmission system 1' thus constructed, a carrier signal outputted from the oscillator 3 is fed to the modulator 4 where it is orthogonally modulated with the baseband signals I, Q and then spread-modulated. The output of this modulator 4 passes through the variable gain circuit 5 and the up-converter 5C and reaches the power amplifier 6 to undergo the linear amplification, before being transmitted through the transmission/receive antenna 9 toward a base station.

Meanwhile, at this time, in the feedback control system 16, the directional coupler 7 derives the present transmission power while the controller 13' controls the gain of the variable gain circuit 5 so that that transmission power comes to a power voltage corresponding to a transmission power control signal from a base station, detected in the reception system 2.

However, in the case of such mobile unit (transmission system 1'), in general the stable gain-variable range the variable gain circuit 5 can provide is approximately 30 dB to 40 dB. Accordingly, although operating well when the gain-variable range needed is relatively narrow (for example, the PDC system requires approximately 20 dB), the mobile unit handles poorly when the gain-variable range needed is extremely wide (particularly, the CDMA system requires approximately 70 dB). In addition, extreme difficulty is experienced to realize a single variable gain amplifier providing a stable gain-variable range above approximately 70 dB according to the existing technique.

Moreover, in systems such as the CDMA system requiring fine (multistage) control of the transmission power over a wide range to accompany the "far and near problem", there is a need to reduce the phase variation (phase varying quantity) of the transmission signal to the gain variation (gain varying quantity) as much as possible (in general, within 5°/dB). However, depending upon circuit arrangement, the phase variation to the gain variation of one variable gain circuit 5 can reach up to approximately 10°/dB. This can make it difficult to demodulate signals normally in a base station.

SUMMARY OF THE INVENTION

The present invention has been developed in consideration of these problems, and it is therefore an object of this invention to provide a portable mobile terminal and a transmission unit which are capable of controlling the transmission power in multistage fashion over a wide range, and of minimizing the phase variation of the transmission signal at this time.

For this purpose, in accordance with this invention, there is provided a portable mobile terminal comprising a modulating section for modulating a transmission signal by using a spectrum spread system; an amplifying section for amplifying the transmission signal, modulated by the modulating section, to a needed transmission power; a frequency converting section put between the modulating section and the amplifying section for conducting a frequency conversion of the transmission signal, modulated by the modulating section, into a radio-frequency signal; a plurality of variable gain units provided between the modulating section and the amplifying section to be connected in series to each other to be capable of changing the gain of the transmission signal modulated by the modulating section, and respectively having gain-to-phase characteristics set so that a phase variation of the transmission signal caused by the entire gain variation of the variable gain units is cancelable; and a control section for controlling a gain of each of the variable gain units in accordance with a transmission power control signal from a base station.

Thus, with the portable mobile terminal according to this invention, the control section controls the gain of each of the variable gain units in accordance with an instruction from the base station, thereby controlling the transmission power in multistage fashion over a wide range and minimizing the phase variation of the transmission signal at that time without conducting special phase compensating control.

Accordingly, it is possible to realize and provide a terminal which can sufficiently satisfy the conditions (wide-range multistage transmission power control and low phase variation) the CDMA system requires.

In this case, although, when all the variable gain units are provided on the output side of the frequency converting section, the more succeeding variable gain units show easier saturation, if some of the variable gain units are provided on the input side of the frequency converting section for frequency-converting a transmission signal into a radio-frequency signal while the remaining variable gain units are installed on the output side of the frequency converting section, such a phenomenon is suppressible.

Furthermore, if as the aforesaid plurality of variable gain units there are provided a first variable gain unit capable of changing the gain of a transmission signal from the modulating section and a second variable gain unit connected in series to the first variable gain unit to enable changing the gain of the transmission signal from the first variable gain unit and having a gain-to-phase characteristic to permit canceling a phase variation of the transmission signal caused by the gain variation of the first variable gain unit, this portable mobile terminal is realizable with an extremely simple configuration.

Also in this instance, although, when all these variable gain units are put on the output side of the frequency converting section, there is a possibility that the succeeding second variable gain unit gets into its saturated condition, if the first variable gain unit is provided on the input side of the frequency converting section while the second variable gain unit is installed on the output side of the frequency converting section (that is, if the frequency converting section is interposed between the first variable gain unit and the second variable gain unit), such a phenomenon is suppressible.

Still further, it is also appropriate that the aforesaid control section is made to be capable of controlling the gain of each of the variable gain units by a control signal common to the variable gain units, or that it is made to be capable of controlling the gains of the variable gain units in a predetermined order by individual control signals for the variable gain units.

With the former, the simplification of the control section is feasible, which contributes greatly to the size reduction of this portable mobile terminal. On the other hand, with the latter, there is no need to control the gains of all the variable gain units simultaneously at the transmission power control, which can improve the signal-to-noise ratio in this portable mobile terminal.

Moreover, in accordance with this invention, there is provided a transmission unit comprising a modulating section for modulating a transmission signal; an amplifying section for amplifying the transmission signal, modulated by the modulating section, to a needed transmission power; a plurality of variable gain units provided between the modulating section and the amplifying section to be connected in series to each other to enable changing a gain of the transmission signal, modulated by the modulating section, and respectively having gain-to-phase characteristics whereby a phase variation of the transmission signal caused by the entire gain variation of the variable gain units is cancelable; and a control section for controlling the gain of each of the variable gain units.

Thus, with the transmission unit according to this invention, the control section controls the gain of each of the variable gain units, thereby controlling the transmission power in multistage fashion throughout a wide range and minimizing the phase variation of the transmission signal without requiring special phase compensating control.

Also in this instance, if as the aforesaid plurality of variable gain units there are provided a first variable gain unit capable of changing the gain of a transmission signal from the modulating section and a second variable gain unit connected in series to the first variable gain unit to enable changing the gain of the transmission signal from the first variable gain unit and having a gain-to-phase characteristic to permit canceling a phase variation of the transmission signal caused by the gain variation of the first variable gain unit, this portable mobile terminal is realizable with an extremely simple configuration.

Furthermore, it is also appropriate that the aforesaid control section is made to be capable of controlling the gain of each of the variable gain units by a control signal common to the variable gain units, or that it is made to be capable of controlling the gains of the variable gain units in a predetermined order by individual control signals for the variable gain units.

Still further, also in this instance, with the former, the simplification of the control section is feasible, which contributes greatly to the size reduction of this portable mobile terminal. On the other hand, with the latter, there is no need to control the gains of all the variable gain units simultaneously at the transmission power control, which can improve the signal-to-noise ratio in this portable mobile terminal.

Besides, if the aforesaid modulating section is designed to modulate a transmission signal according to a spectrum spread system, it is possible to realize a transmission unit sufficiently meeting even the CDMA system particularly requiring the wide-range multistage transmission power control and the low phase variation.

DESCRIPTION OF THE PREFERRED EMBODIMENTS

Figure 1:
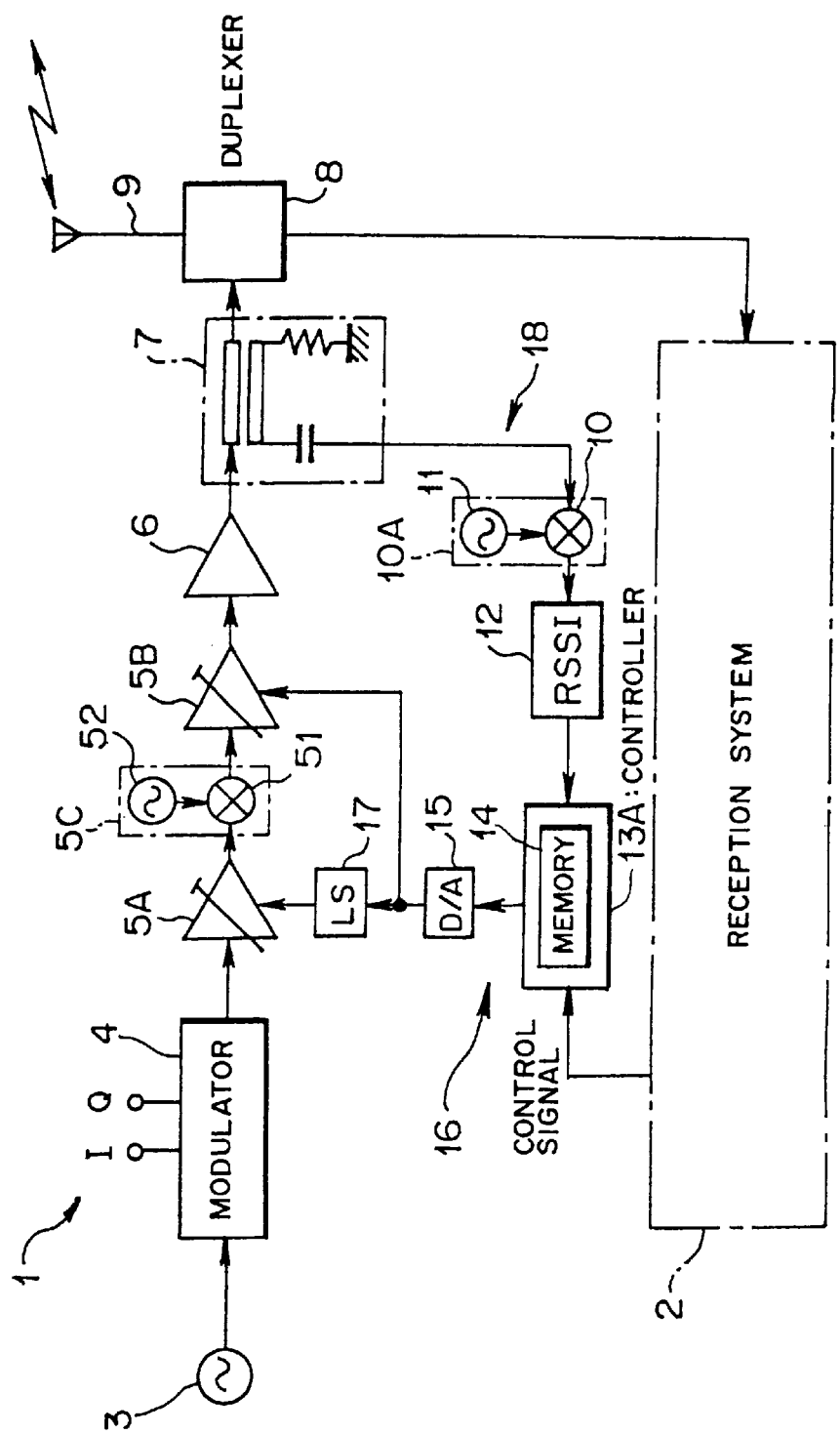
FIG. 1 is a block diagram showing a configuration of an essential part of a portable mobile terminal according to an embodiment of the present invention.

(A) Description of an Embodiment of this Invention

Referring to the drawings, a description will be made hereinbelow of an embodiment of the present invention.

Figure 11:
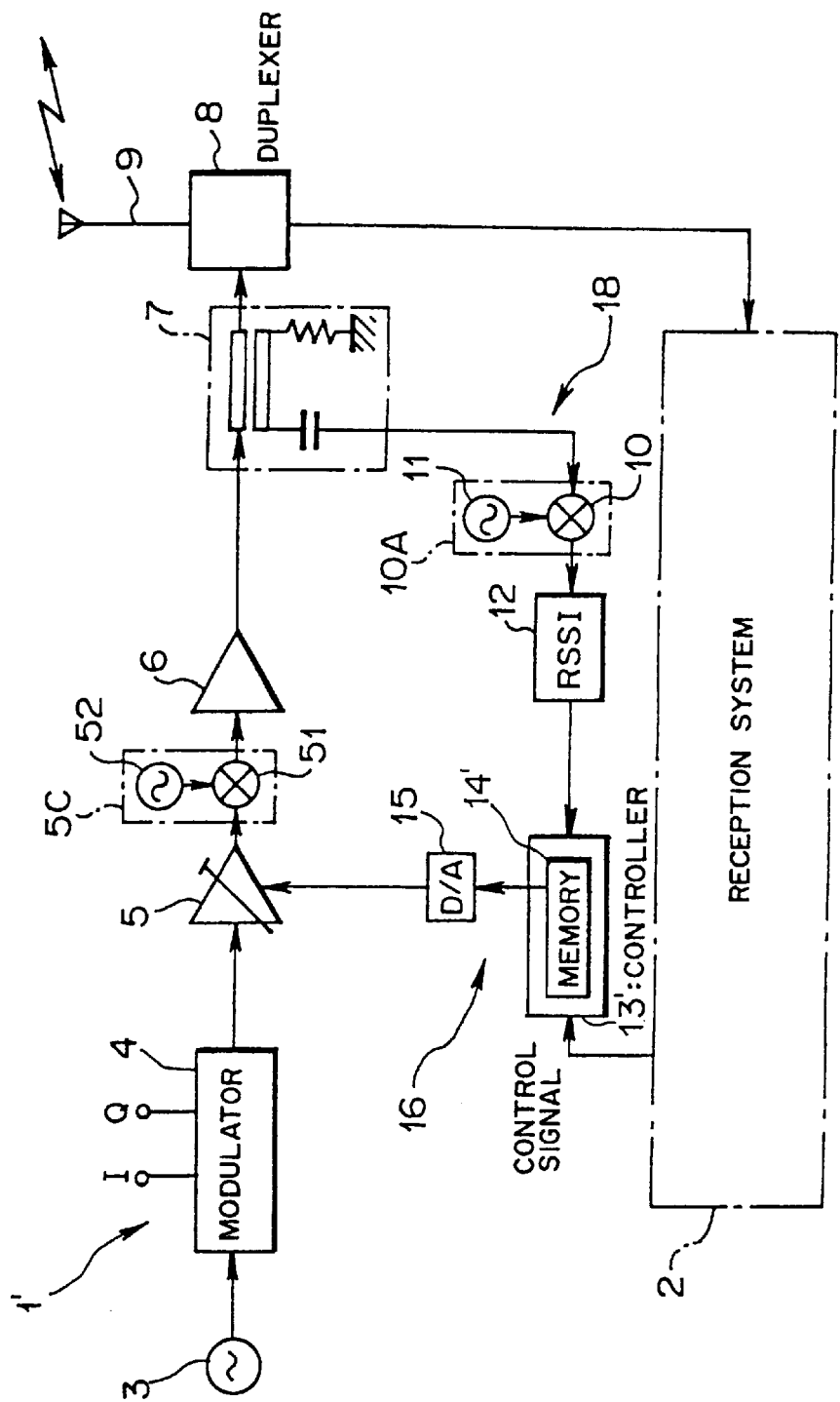
FIG. 11 is a block diagram showing an example of configuration of the essential part of a portable mobile terminal (transmission system).

FIG. 1 is a block diagram showing a configuration of the essence of a radiocommunication unit (portable mobile terminal) according to an embodiment of the present invention. In FIG. 1, the portable mobile terminal is applicable to the CDMA system being a family of a multiplex radiocommunication system, and is different from the portable mobile terminal shown in FIG. 11 in that a transmission system (transmission unit) 1 includes variable gain type amplifiers 5A, 5B, a controller 13A containing a memory 14, and a level shift circuit (LS) 17. Incidentally, in FIG. 1, parts designated at the same reference numerals as those in FIG. 11 are the same as or similar to the parts in FIG. 11.

In this configuration, the variable gain type amplifiers (variable gain units) 5A, 5B are connected in series to each other on the input side of a power amplifier (amplifying section) 6 so that the gain of a transmission signal after undergoing a modulation (for example, an orthogonal modulation and a spectrum spread modulation) by a modulator 4 is variable. In this embodiment, the variable gain type amplifier. 5A functions as a first variable gain unit capable of changing the gain of the transmission signal from the modulator 4 while the variable gain type amplifier 5B acts as a second variable gain unit connected in series to the first variable gain unit 5A to enable changing the gain of the transmission signal from the first variable gain unit 5A.

Incidentally, although the mounted positions (an IF stage, an RF stage or the like) of these variable gain type amplifiers 5A, 5B are not particularly specified, if both are placed at the RF stage as the RF band amplifiers 5A, 5B, the input level to the succeeding amplifier 5B becomes extremely high and the amplifier 5B may get into the saturated condition. For this reason, in this embodiment, as shown in FIG. 1, the variable gain type amplifier 5A is installed at the IF stage (on the input side of an up-converter 5C) as an IF band amplifier, while the variable gain type amplifier 5B is put at the RF stage (on the output side of the up-converter 5C) as an RF band amplifier (that is, the up-converter 5C is interposed between the variable gain type amplifier 5A and the variable gain type amplifier 5B).

Furthermore, in a feedback control system 16, the controller (control section) 13A is for controlling the gains of these variable gain type amplifiers (which merely will be referred hereinafter to as variable amplifiers) 5A, 5B in accordance with an instruction (transmission power control signal) from a base station (not shown). Also in this case, it controls the gains thereof so that the present transmission power (transmission power after the amplification by the power amplifier 6) detected (monitored) by a transmission power detecting section 18 (a directional coupler 7, a mixer 10, an oscillator 11 and an RSSI detector 12) reaches a desired power value (a power value corresponding to a transmission power control signal from a base station, detected by a reception system 2).

By installing the two variable amplifiers 5A, 5B and controlling the gain of each of the variable amplifiers 5A, 5B in this way, it is possible to decrease the gain variation (range) per each of the variable amplifiers 5A, 5B, and to implement the wide-range (for example, above approximately 70 dB) transmission power control, the CDMA system requires, with an extremely simple structure using the existing variable amplifiers 5A, 5B showing a low gain variation (for example, approximately 40 dB).

Figure 4:
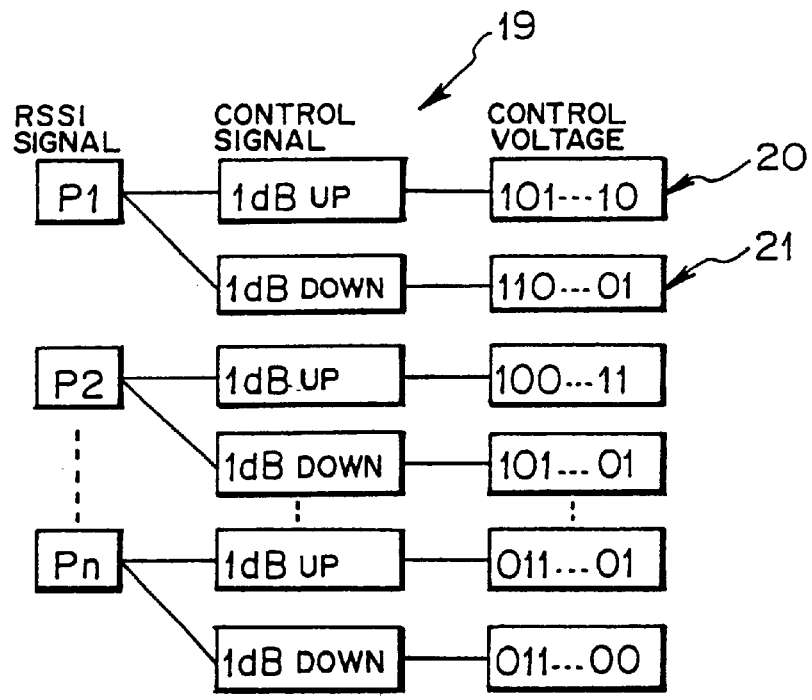
FIG. 4 is an illustration useful for explaining data (correspondence table) to be stored in a memory of the controller in this embodiment.

Concretely, the controller 13A refers to data [a table indicating a correspondence among an RSSI signal (the present transmission power value), a transmission power control signal from a base station and a control voltage value (gain control signal) to be outputted] 19 shown in FIG. 4 and stored in advance in a memory (storage section) 14, such as a ROM and a RAM, thereby determining a control voltage value (n-bit digital data) to be outputted to each of the variable amplifiers 5A, 5B and outputting it.

For instance, when the present transmission power value (RSSI signal) is taken to be P1, if the base station transmits an instruction for an increase (decrease) of the transmission power by 1 dB [transmission power control signal=1 dB up (down)], upon receipt of this instruction through the reception system 2, the controller 13A outputs the digital data, denoted at a reference numeral 20 (21) in the correspondence table 19, as a control voltage value (which sometimes will be referred hereinafter to as a digital voltage value).

This digital voltage value is converted into an analog voltage value in a D/A converter 15 and then supplied to each of the variable amplifiers 5A, 5B. However, in this embodiment, one variable amplifier 5A receives the supply of the analog voltage value after the level shifting by the level shift circuit 17. Incidentally, the function (level shift processing) of this level shift circuit 17 will be described in detail herein later.

Meanwhile, in the case of controlling the transmission power in this way, as mentioned before, there is a need to reduce the phase change (variation) of the transmission signal at the gain variation. In the case that the two variable amplifiers 5A, 5B are controlled through the one D/A converter 15 as described above, if the gain-to-phase characteristics (the gradient of a phase to a gain) of the variable amplifiers 5A, 5B are identical or substantially identical to each other, the phase varying quantity to the gain variation increases as a whole.

Figure 2A:
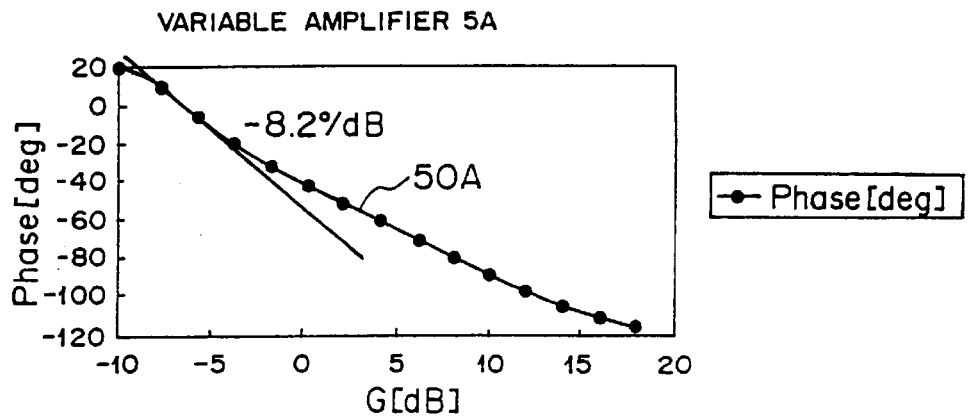
FIGS. 2A and 2B are diagrams respectively showing examples of gain-to-phase characteristics of variable gain type amplifiers in this embodiment.
Figure 2B:
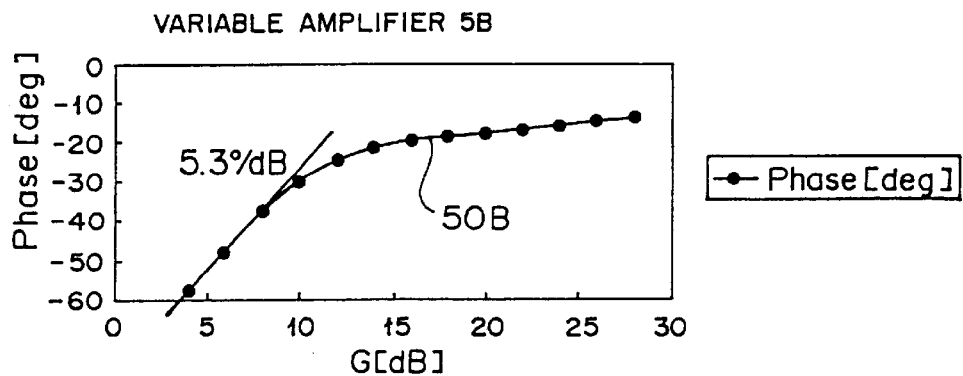
Figure 2C:
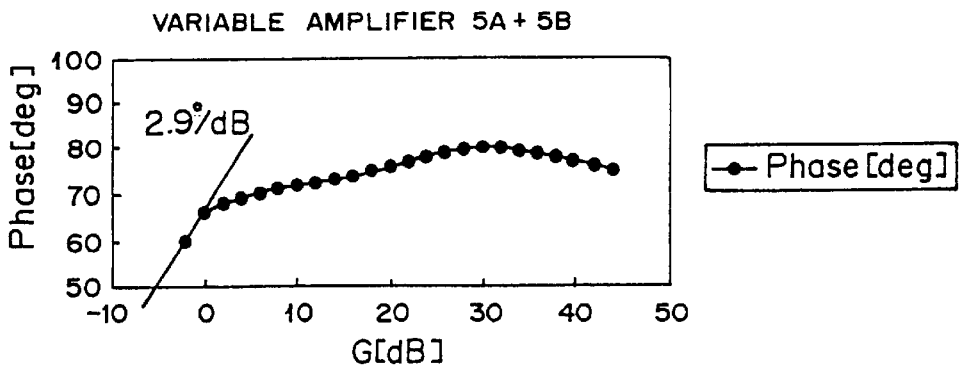
FIG. 2C is a diagram showing a composed characteristic of the gain-to-phase characteristics shown in FIGS. 2A and 2B.
Figure 3:
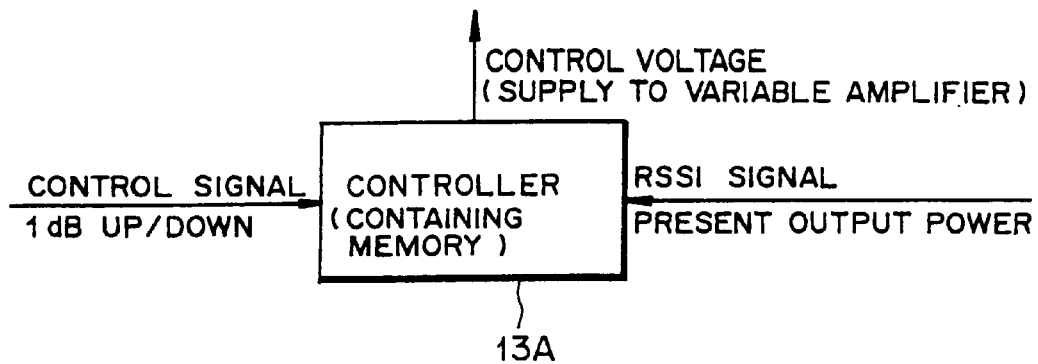
FIG. 3 is a block diagram showing an arrangement intended for a controller in this embodiment.

For this reason, in this embodiment, for instance, the variable amplifier 5A is designed to provide a gain-to-phase characteristic 50A lowering rightwardly (negative gradient) as shown in FIG. 2A, while the variable amplifier 5B is made to have a gain-to-phase characteristic 50B rising rightwardly (positive gradient) as shown in FIG. 2B. Accordingly, the entire (composed) characteristic of the gain-to-phase characteristics of the variable amplifiers 5A, 5B becomes as shown in FIG. 2C, which results in the reduction of the phase variation to the gain variation.

For instance, if the maximum values of the phase variations (gradients) to the gain variations of the variable amplifiers 5A, 5B are −8.2°/dB and 5.3°/dB, respectively, as shown in FIGS. 2A and 2B, when the gain is controlled only with the variable amplifier 5A, the phase variation comes to a maximum of 8.2°/dB. On the other hand, when the two variable amplifiers 5A, 5B are connected in series to each other as noted above, the phase variations to the gain variations offset each other, with the result that the phase variation to the entire gain variation can be held down to be a maximum of approximately 2.9°/dB.

Thus, the portable mobile terminal (transmission system 1) according to this embodiment is equipped with the two variable amplifiers 5A, 5B which are connected in series to each other between the modulator 4 and the power amplifier 6 to enable changing the gain of a transmission signal modulated in the modulator 4, and which respectively have gain-to-phase characteristics set to enable canceling the phase variation of the transmission signal to the entire gain variation.

As described above, with the installation of the two variable amplifiers 5A, 5B having different properties whereby the gain-to-phase characteristics 50A, 50B cancel each other, not only the phase variation to the entire gain variation is suppressible to a minimum, but also the dynamic range is enlargeable.

Secondly, a detailed description will be given hereinbelow of the aforesaid level shift circuit 17. The level shift circuit 17 is needed for, for example, in the case that an increase in the control voltage for the variable amplifier 5A causes an increase in gain while an increase in the control voltage for the variable amplifier 5B leads to a decrease in gain, simultaneously increasing or decreasing the gains of the variable amplifiers 5A, 5B in accordance with a single control signal (control voltage value).

Figure 6:
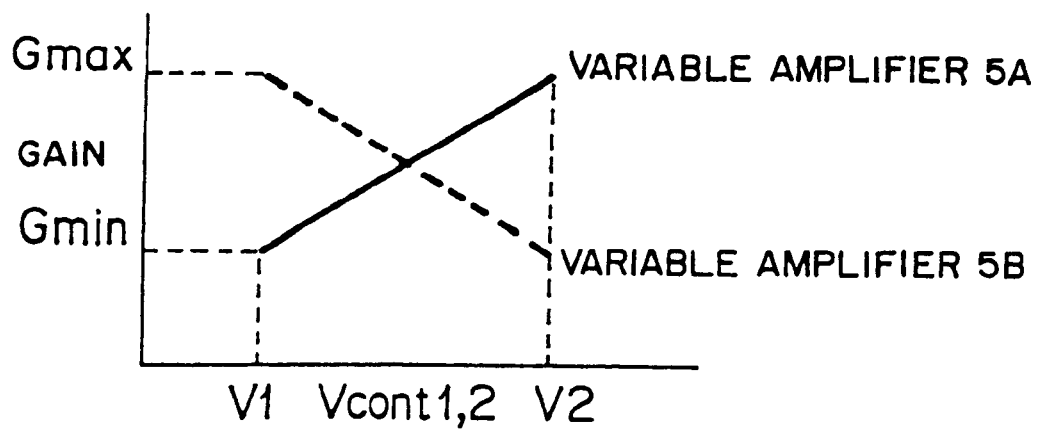
FIG. 6 is an illustration of one example of the relationship between control voltage values for the variable gain type amplifiers and gains in this embodiment.

FIG. 6 is an illustration of one example of the relationship between the control voltage values for the variable amplifiers 5A, 5B and the gains. In FIG. 6, for example, the solid line shows the relationship between a control voltage value of the variable amplifier 5A and a gain, while a broken line indicates the relationship between a control voltage value for the variable amplifier 5B and a gain. That is, for instance, if a control voltage value of V1 (V2) is applied to each of the variable amplifiers 5A, 5B, the variable amplifier 5B (5A) comes to a maximum gain Gmax, while the variable amplifier 5A (5B) provides a minimum gain Gmin.

Thus, in the case that a control voltage value outputted from the D/A converter 15 is supplied directly to each of the variable amplifiers 5A, 5B, the gains thereof cancel each other. Accordingly, in order to maximize each of the gains of the variable amplifiers 5A, 5B, there is a need to set the control voltage values for the variable amplifiers 5A, 5B at V2 and V1, respectively.

Figure 7A:
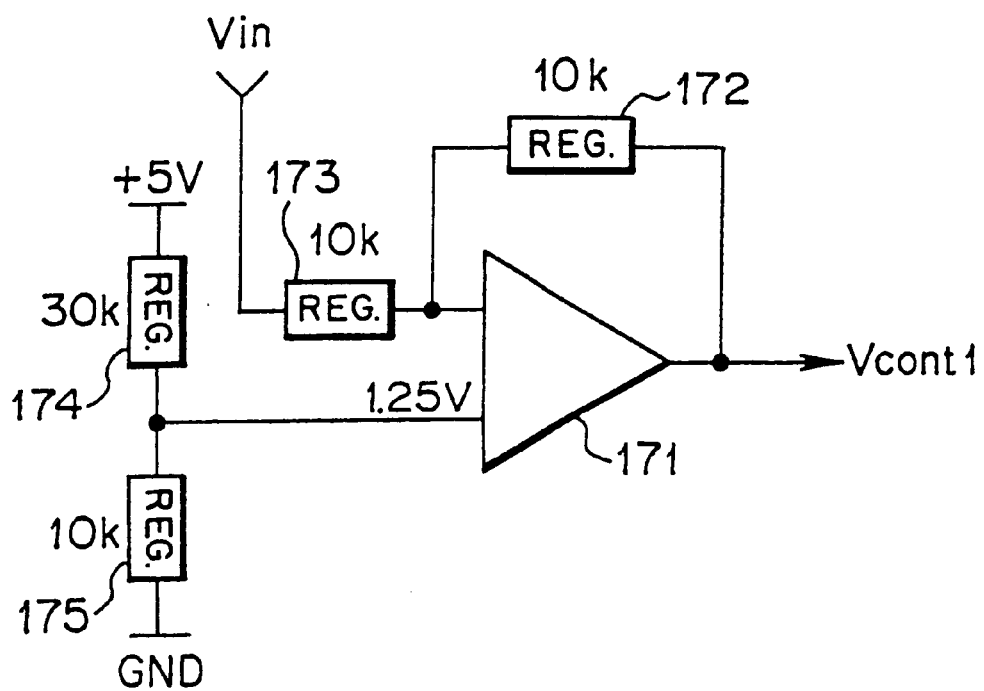
FIG. 7A is a block diagram showing an example of configuration of a level shift circuit in this embodiment.
Figure 7B:
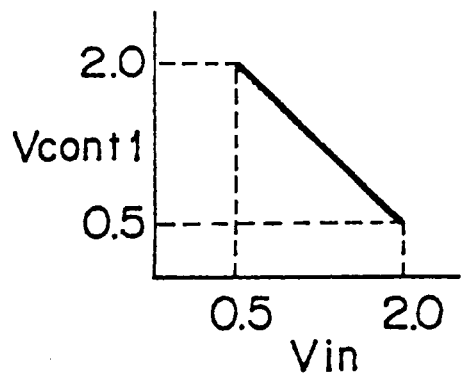
FIG. 7B is an illustration of an example of input/output voltage characteristic of the level shift circuit shown in FIG. 7A.

For this reason, the level shift circuit 17 is, for example as shown in FIG. 7A, composed of an operational amplifier 171 and resistors (REGs) 172 to 175, and, as shown in FIG. 7B, constructed to have an input/output voltage characteristic to output a control voltage value V2 (=2.0 V) at input of V1 (=0.5 V) while outputting a control voltage value V1 (=0.5 V) at input of the control voltage value V2 (=2.0 V).

Figure 5:
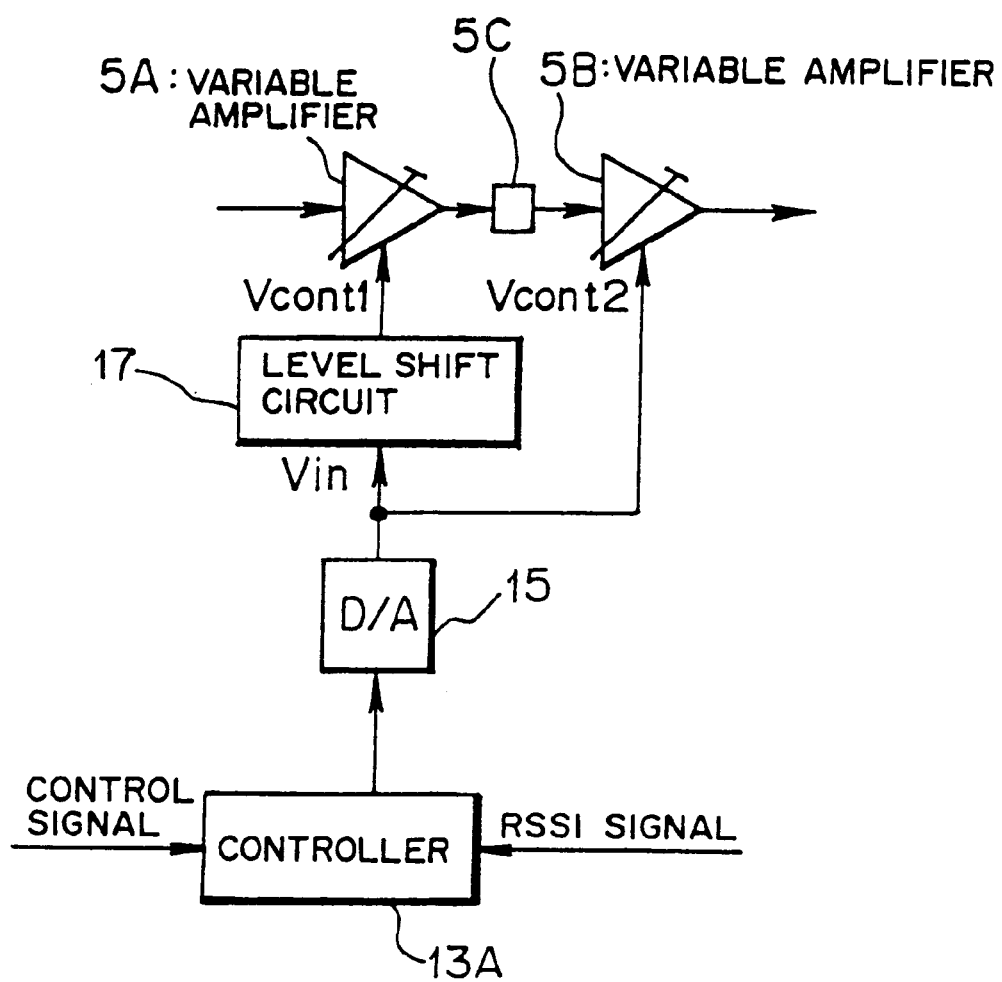
FIG. 5 is a block diagram showing an arrangement intended for the essential part of a transmission system in this embodiment.

Thus, as FIGS. 1 and 5 show, with a single control voltage value outputted from the D/A converter 15, the gains of the respective variable amplifiers 5A, 5B are controlled simultaneously to desired values. That is, in this embodiment, the controller 13A can control each of the gains of the variable amplifiers 5A, 5B with a control signal common to the variable amplifiers 5A, 5B, which enables simplification of the controller 13A and contributes greatly to the size reduction of this portable mobile terminal (transmission system 1).

As described above, with the portable mobile terminal (transmission system 1) according to this embodiment, since the two variable amplifiers 5A, 5B respectively have gainto-phase characteristics (see FIGS. 2A and 2B) capable of canceling the phase variation of a transmission signal caused by the entire gain variation of the amplifiers 5A, 5B, it is possible to control the transmission power in multistage fashion (in steps of 1 dB) throughout a wide range (above approximately 70 dB), and further to suppress the phase variation of the transmission signal at that time to a minimum (below 5°/dB) without implementing special phase compensating control.

Particularly, in this embodiment, since the existing units can be used as the variable amplifiers 5A, 5B, with a simple configuration and at a low cost, it is possible to realize and provide a portable mobile terminal (transmission system 1) sufficiently meeting the CDMA system particularly requiring the wide-range multistage transmission power control and the low phase variation due to the "far and near problem".

Figure 8:
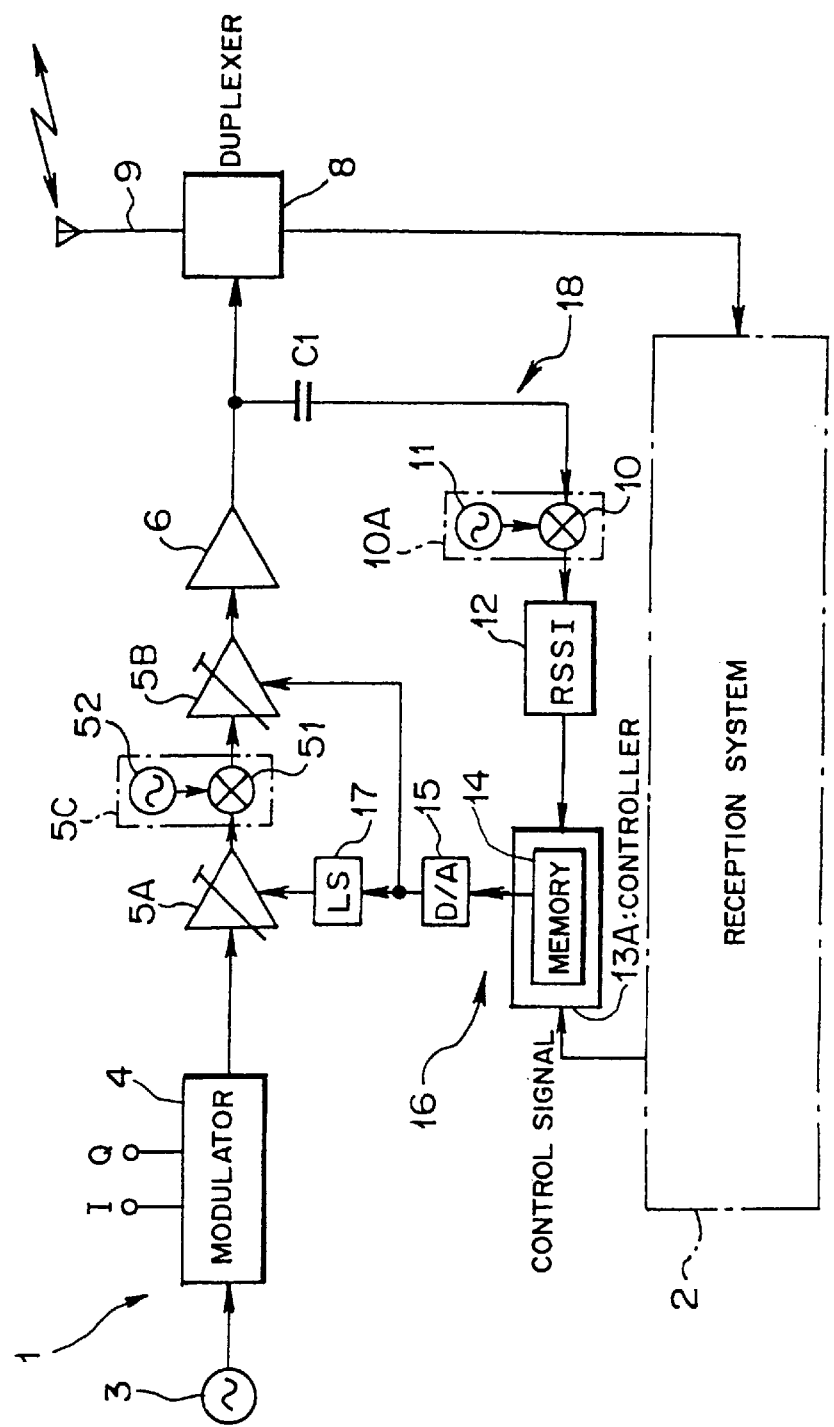
FIG. 8 is a block diagram showing another configuration of the portable mobile terminal (transmission system) shown in FIG. 1.

Besides, although, in the above-described embodiment, a portion of the present transmission power is taken out (monitored) by the directional coupler 7, it is also appropriate that, for example as shown in FIG. 8, the directional coupler 7 is replaced with a capacitor C1 and a portion of the transmission power is derived by loose coupling. In this case, as compared with the case of the use of the directional coupler 7, a reduction of the unit scale becomes feasible. However, the directional coupler 7 is superior thereto in accuracy and stability of the monitoring of the transmission power.

(B) Description of a Modification

Figure 9:
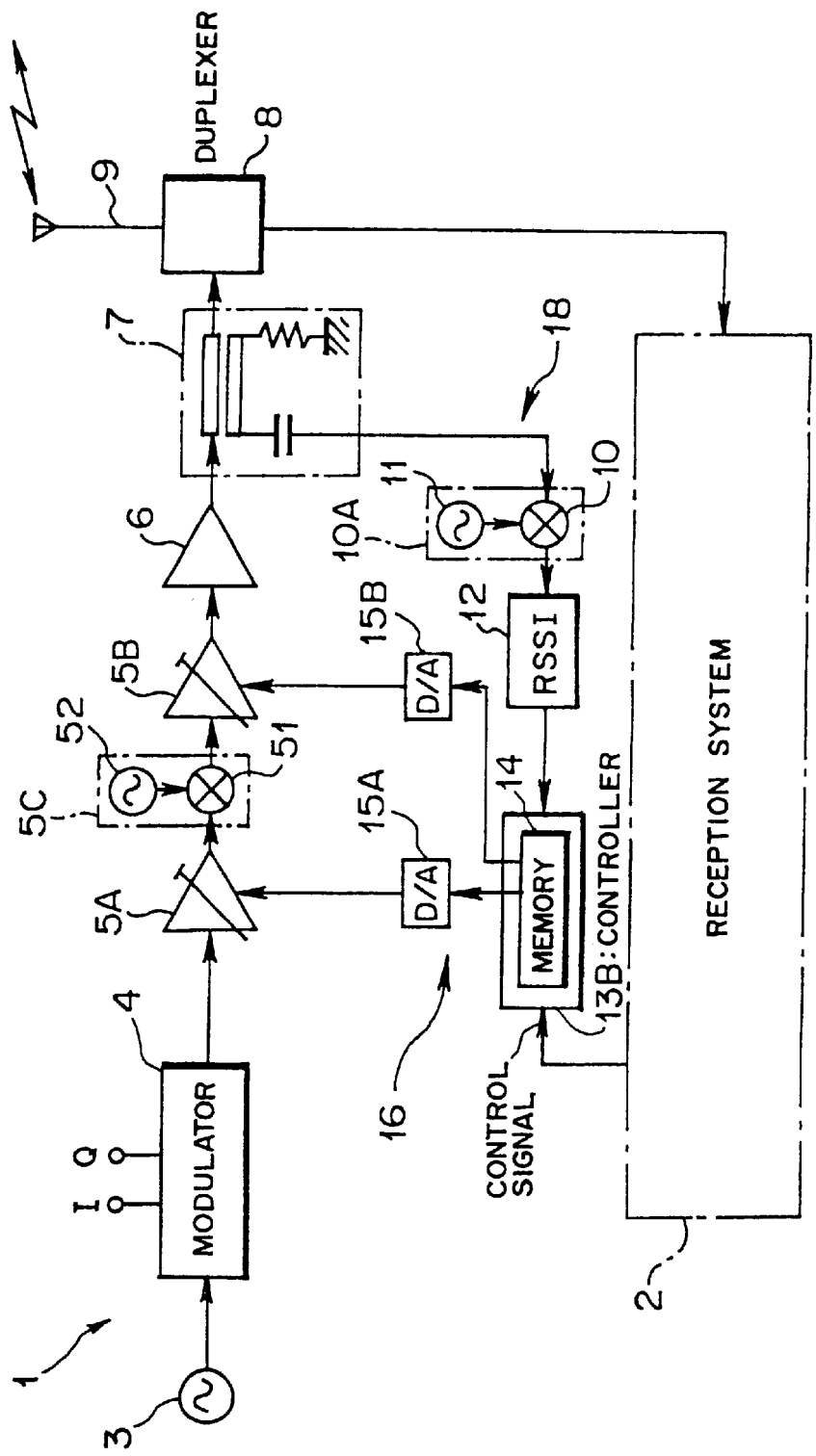
FIG. 9 is a block diagram showing a modification of the portable mobile terminal (transmission system) shown in FIG. 1.

FIG. 9 is a block diagram showing a modification of the portable mobile terminal (transmission system 1) shown in FIG. 1. As compared with the terminal of FIG. 1, in the portable mobile terminal (transmission system 1) shown in FIG. 9, a controller 13B is provided in place of the aforesaid controller 13A, and the difference therefrom is that the controller 13B determines a control voltage value (digital voltage value) for each of variable amplifiers 5A, 5B and outputs it thereto. Accordingly, in this modification, D/A converters 15A, 15B are provided to convert digital voltage values for the variable amplifiers 5A, 5B into analog voltage values, respectively.

Incidentally, in FIG. 9, parts marked with the above-used reference numerals are similar to those described above, and the detailed description will be omitted for brevity.

In this modification, for example, the controller (control section) 13B carries out transmission power control through the use of the gain variable range of the variable amplifier 5A at first, and in the case of conducting the transmission power control exceeding the gain variable range of the variable amplifier 5A, produces control voltage values for the variable amplifiers 5A, 5B in order to implement the transmission power control also using the gain variable range of the variable amplifier 5B.

That is, this controller 13B is made to be capable of controlling the gains of the variable amplifiers 5A, 5B in a predetermined order with individual control signals to the variable amplifiers 5A, 5B. Accordingly, also with the portable mobile terminal (transmission system 1) according to this modification, the same effects as those of the above-described embodiment are obtainable, and additionally, in this case, since there is no need to control all the gains of the variable amplifiers 5A, 5B simultaneously at the transmission power control, the S/N ratio of this portable mobile terminal (transmission system 1) is improvable.

Figure 10:
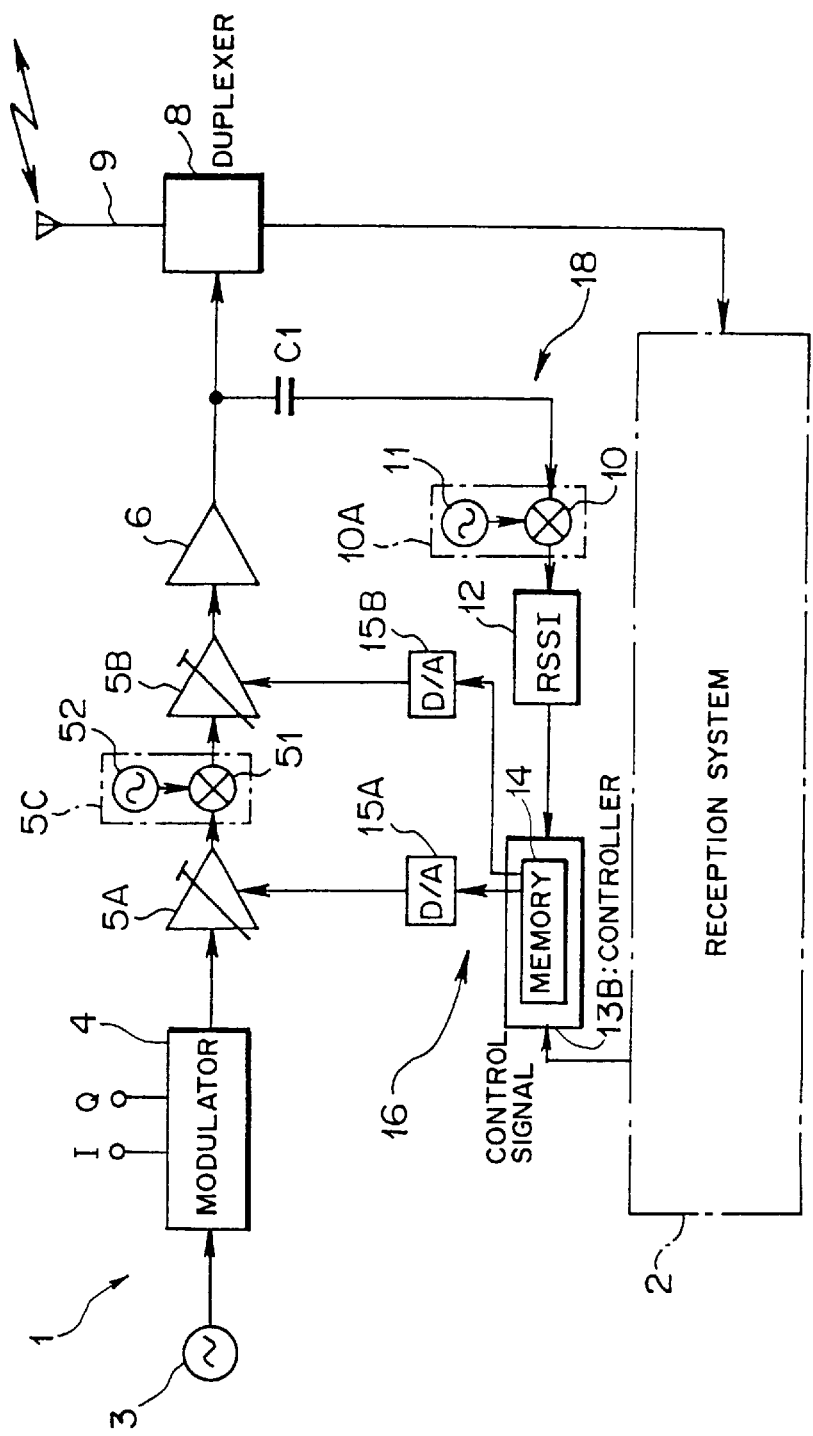
FIG. 10 is a block diagram showing another configuration of the portable mobile terminal (transmission system) shown in FIG. 9.

Besides, also in this modification, it is also acceptable that, for example as shown in FIG. 10, a capacitor C1 is used in place of the directional coupler 7 to derive a portion of the transmission power through the loose coupling.

(C) Others

Although, in both the above-described embodiment and modification, this portable mobile terminal (transmission system 1) is applied to the CDMA system using the spectrum spread modulation, this invention is not limited to this, but is also applicable to other multiplex radiocommunication systems such as the TDMA (Time-Division Multiple Access) and the FDMA (Frequency-Division Multiple Access). That is, the aforesaid modulator 4 can be constructed to conduct the primary modulation such as the QPSK and 16 QAM.

In addition, although, in both the above-described embodiment and modification, the transmission system (transmission unit) 1 is mounted in a portable mobile terminal such as a portable telephone, this invention is not limited to this, but can also be mounted in other radiocommunication units.

Still additionally, although, in both the above-described embodiment and modification, the variable amplifiers 5A, 5B are used as variable gain units, this invention is not limited to this, but any circuit having a peculiar gain-to-phase characteristic is also acceptable, which can offer the same effects as those mentioned above.

Furthermore, although, in both the above-described embodiment and modification, two variable amplifiers (variable gain units) 5A, 5B are provided in the transmission system 1, this invention is not limited to this, but it is also possible to install three or more variable gain units as long as they at least have characteristics to cancel the phase variation to the entire gain variation. In this case, it is possible to enlarge the gain variable range while minimizing the phase varying quantity to the entire gain variation.

Still further, in this case, if a portion of the variable gain units is provided on the input side (IF stage) of the up-converter 5C while the remainder (at least one variable gain unit) is installed on the output side (RF stage) of the up-converter 5C, the saturation of the variable gain units is suppressible as mentioned before.

Moreover, although, in both the above-described embodiment and modification, both the controllers 13A, 13B are made to control the gains of the variable gain units 5A, 5B in accordance with instructions (transmission power control signals) from a base station, it is also acceptable that the gain control by the controllers 13A, 13B is implemented in accordance with an instruction from an external unit other than the base station, or is carried out in accordance with a unique instruction in its own unit.

Besides, this invention is not limited to the above-described embodiment and modification, but it is possible to cover all changes and modifications, which do not constitute departures from the spirit and scope of the invention.

What is claimed is:

1. A portable mobile terminal comprising:
   a modulating section for modulating a transmission signal by using a spectrum spread system;
   an amplifying section for amplifying said transmission signal, modulated by said modulating section, to a needed transmission power;
   a plurality of variable gain units provided between said modulating section and said amplifying section to be connected in series to each other for changing a gain of said transmission signal modulated by said modulating section, one or more of said plurality of variable gain units respectively having negative gradient gain-to-phase characteristics and the other one or more of said variable gain units respectively having positive gradient gain-to-phase characteristics to cancel a phase variation of said transmission signal caused by the entire gain variation; and a control section for controlling a gain of each of said variable gain units in accordance with a transmission power control signal from a base station.

2. A portable mobile terminal as defined in claim 1, further comprising:

a frequency converting section placed between said modulating section and said amplifying section for conducting a frequency conversion of said transmission signal, modulated by said modulating section, into a radio-frequency signal, wherein a part of said plurality of variable gain units, is provided on an input side of said frequency converting section while the remainder is provided on an output side of said frequency converting section.

3. A portable mobile terminal as defined in claim 2, wherein said control section is made to control a gain of each of said variable gain units by a control signal common to said variable gain units.

4. A portable mobile terminal as defined in claim 2, wherein said control section is made to control gains of said variable gain units in a predetermined order by individual control signals for said variable gain units.

5. A portable mobile terminal as defined in claim 1, wherein said plurality of variable gain units includes:

a first variable gain unit for changing a gain of said transmission signal from said modulating section, and having a negative gradient gain-to-phase characteristic; and a second variable gain unit connected in series to said first variable gain unit for changing a gain of said transmission signal from said first variable gain unit, and having a positive gradient gain-to-phase characteristic to cancel a phase variation of said transmission signal to a gain variation of said first variable gain unit.

6. A portable mobile terminal as defined in claim 5, further comprising:

a frequency converting section placed between said modulating section and said amplifying section for conducting a frequency conversion of said transmission signal, modulated by said modulating section, into a radio-frequency signal, wherein said frequency converting section is placed between said first variable gain unit and said second variable gain unit.

7. A portable mobile terminal as defined in claim 6, wherein said control section is made to control a gain of each of said variable gain units by a control signal common to said variable gain units.

8. A portable mobile terminal as defined in claim 6, wherein said control section is made to control gains of said variable gain units in a predetermined order by individual control signals for said variable gain units.

9. A portable mobile terminal as defined in claim 5, wherein said control section is made to control a gain of each of said variable gain units by a control signal common to said variable gain units.

10. A portable mobile terminal as defined in claim 5, wherein said control section is made to control gains of said variable gain units in a predetermined order by individual control signals for said variable gain units.

11. A portable mobile terminal as defined in claim 1, wherein said control section is made to control a gain of each of said variable gain units by a control signal common to said variable gain units.

12. A portable mobile terminal as defined in claim 1, wherein said control section is made to control gains of said variable gain units in a predetermined order by individual control signals for said variable gain units.

13. A transmission unit comprising:

a modulating section for modulating a transmission signal;

an amplifying section for amplifying said transmission signal, modulated by said modulating section, to a needed transmission power;

a plurality of variable gain units provided between said modulating section and said amplifying section to be connected in series to each other for changing a gain of said transmission signal modulated by said modulating section, one or more of said plurality of variable gain units respectively having negative gradient gain-to-phase characteristics and the other one or more of said variable gain units respectively having positive gradient gain-to-phase characteristics to cancel a phase variation of said transmission signal to the entire gain variation; and a control section for controlling a gain of each of said variable gain units.

14. A transmission unit as defined in claim 13, wherein said plurality of variable gain units includes:

a first variable gain unit for changing a gain of said transmission signal from said modulating section, and having a negative gradient gain-to-phase characteristic; and a second variable gain unit connected in series to said first variable gain unit for changing a gain of said transmission signal from said first variable gain unit, and having a positive gradient gain-to-phase characteristic to cancel a phase variation of said transmission signal caused by a gain variation of said first variable gain unit.

15. A transmission unit as defined in claim 14, wherein said control section is made to control a gain of each of said variable gain units by a control signal common to said variable gain units.

16. A transmission unit as defined in claim 14, wherein said control section is made to control gains of said variable gain units in a predetermined order by individual control signals for said variable gain units.

17. A transmission unit as defined in claim 13, wherein said control section is made to control a gain of each of said variable gain units by a control signal common to said variable gain units.

18. A transmission unit as defined in claim 13, wherein said control section is made to control gains of said variable gain units in a predetermined order by individual control signals for said variable gain units.

19. A transmission unit as defined in claim 13, wherein said modulating section is made to modulate said transmission signal by using a spectrum spread system.

20. A portable mobile terminal comprising:

a transmitter transmitting a modulated transmission signal, said transmitter having a modulator to modulate the transmission signal through the use of a spectrum spread system;

an amplifier to amplify the transmission signal, modulated by said modulator, to a needed transmission power;

a first variable gain unit, connected to said modulator, to change a gain of the transmission signal modulated by said modulator, and having a negative gradient gain-to-phase characteristic;

a frequency converter, connected to said first variable gain unit, to conduct a frequency conversion of the transmission signal from said first variable gain unit into a radio frequency signal;

a second variable gain unit, connected to said frequency converter, to change a gain of the transmission signal converted by said frequency converter, and having a positive gradient gain-to-phase characteristic to cancel a phase variation of the transmission signal caused by the entire gain variation of said variable gain units; and a controller, connected to said first and second variable gain units, to control a gain of said first and second variable gain units in accordance with a transmission power control signal from a base station.

21. A portable mobile terminal comprising:

a transmitter transmitting a modulated transmission signal, said transmitter having a modulator to modulate the transmission signal through the use of a spectrum spread system;

an amplifier to amplify the transmission signal, modulated by said modulator, to a needed transmission power;

a plurality of variable gain units, provided between said modulator and said amplifier to be connected in series to each other to change a gain of the transmission signal modulated by said modulator, one or more of said plurality of variable gain units having negative gradient gain-to-phase characteristics and the other one or more of said variable gain units having positive gradient gain-to-phase characteristics to cancel a phase variation of the transmission signal caused by the entire gain variation of said variable gain units; and a controller to control a gain of said plurality of variable gain units in accordance with a transmission power control signal from a base station.

22. A transmitter comprising:

a modulator to modulate a transmission signal through the use of a spectrum spread system;

an amplifier to amplify the transmission signal, modulated by said modulator, to a needed transmission power;

a first variable gain unit, connected to said modulator, to change a gain of the transmission signal modulated by said modulator, and having a negative gradient gain-to-phase characteristic;

a frequency converter, connected to said first variable gain unit, to conduct a frequency conversion of the transmission signal from said first variable gain unit into a radio frequency signal;

a second variable gain unit, connected to said frequency converter, to change a gain of the transmission signal converted by said frequency converter, and having a positive gradient gain-to-phase characteristic to cancel a phase variation of the transmission signal caused by the entire gain variation of said variable gain units; and a controller, connected to said first and second variable gain units, to control a gain of said first and second variable gain units in accordance with a transmission power control signal from a base station.

23. A transmitter comprising:

a modulator to modulate a transmission signal;

an amplifier to amplify the transmission signal, modulated by said modulator, to a needed transmission power;

a plurality of variable gain units, provided between said modulator and said amplifier to be connected in series to each other, to change a gain of the transmission signal modulated by said modulator, one or more of said plurality of variable gain units having negative gradient gain-to-phase characteristics and the other one or more of said variable gain units having positive gradient gain-to-phase characteristics to cancel a phase variation of the transmission signal caused by the entire gain variation of said variable gain units; and a controller to control a gain of said plurality of variable gain units.

* * * * *